(12) United States Patent
Zhang et al.

(10) Patent No.: US 11,880,239 B2
(45) Date of Patent: Jan. 23, 2024

(54) DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Zhuo Zhang, Hubei (CN); Xiaoqian Ma, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 297 days.

(21) Appl. No.: 17/292,463

(22) PCT Filed: Mar. 31, 2021

(86) PCT No.: PCT/CN2021/084267
§ 371 (c)(1),
(2) Date: May 10, 2021

(87) PCT Pub. No.: WO2022/193366
PCT Pub. Date: Sep. 22, 2022

(65) Prior Publication Data
US 2022/0357774 A1 Nov. 10, 2022

(30) Foreign Application Priority Data
Mar. 18, 2021 (CN) .......................... 202110289085.X

(51) Int. Cl.
*G06F 1/16* (2006.01)

(52) U.S. Cl.
CPC .......... *G06F 1/1652* (2013.01); *G06F 1/1624* (2013.01)

(58) Field of Classification Search
CPC ...... G06F 1/1652; G06F 1/1624; G09F 9/301; H04M 1/0268
See application file for complete search history.

(56) References Cited

U.S. PATENT DOCUMENTS

| 10,754,386 | B2 * | 8/2020 | Lee | G06F 1/1624 |
| 11,058,018 | B1 * | 7/2021 | Yoon | G06F 1/1624 |

(Continued)

FOREIGN PATENT DOCUMENTS

| CN | 208386626 U | 1/2019 |
| CN | 109873883 A | 6/2019 |

(Continued)

*Primary Examiner* — Rockshana D Chowdhury
(74) *Attorney, Agent, or Firm* — Mark M. Friedman

(57) ABSTRACT

The present disclosure provides a display device, including a housing, a flexible screen including a display region and a light-transmitting region, a display window formed on the housing, and a screen tension assembly installed in the housing, wherein the screen tension assembly is configured to apply a pre-tensioning force to the flexible screen. The flexible screen is slidable relative to the housing to make the display device be in a first state, wherein in the first state, the display region of the flexible screen is opposite to the display window, and the light-transmitting region is located outside the display window. The display device provided by the present disclosure can realize full-screen display, thereby improving display effect of the display device.

17 Claims, 4 Drawing Sheets

(56)       References Cited

U.S. PATENT DOCUMENTS

| | | | |
|---|---|---|---|
| 11,194,363 B2* | 12/2021 | Kim | G06F 1/1652 |
| 11,523,526 B2* | 12/2022 | Liu | G06F 1/1624 |
| 2016/0139633 A1 | 5/2016 | Lee | |
| 2022/0221907 A1* | 7/2022 | Cai | G06F 1/1624 |
| 2022/0232716 A1* | 7/2022 | Lim | H10K 50/80 |
| 2022/0238047 A1* | 7/2022 | Shin | G06F 1/1652 |
| 2022/0263932 A1* | 8/2022 | Jo | H04M 1/0237 |

FOREIGN PATENT DOCUMENTS

| | | | |
|---|---|---|---|
| CN | 110166590 A | 8/2019 |
| CN | 209267628 U | 8/2019 |
| CN | 110782783 A | 2/2020 |
| CN | 111508374 A | 8/2020 |
| CN | 111768709 A | 10/2020 |
| CN | 111866225 A | 10/2020 |
| CN | 111970392 A | 11/2020 |
| CN | 112398986 A | 2/2021 |

* cited by examiner

DISPLAY DEVICE

FIELD OF INVENTION

The present disclosure relates to a field of display technology and more particularly to a display device.

BACKGROUND OF INVENTION

As people's requirements for mobile phone screens become higher, full-screen display has become an inevitable trend. However, a front camera of mobile phones occupies screen space, and pictures displayed in the occupied area are missing, hence true full-screen display cannot be realized. The industry adopts digging a groove on a housing and installing a camera in the groove so that the camera can be raised and lowered. When photography is needed, the camera extends from the groove, and when photography is not needed, the camera is hidden in the groove. This design requires a design of a lifting component to control lifting of the camera. Moreover, during photography, the camera is exposed and easily damaged. In addition, existence of the groove prevents the mobile phone screen from realizing true full-screen display. Therefore, a full-screen mobile phone in prior art cannot realize true full-screen display even in a non-photography state.

SUMMARY OF INVENTION

The display device provided by the present disclosure can realize full-screen display in non-photography state and can protect optical assembly.

In order to solve the above problems, the technical solution provided by the present disclosure is as follows:

The present disclosure provides a display device, includes:
- a housing;
- a flexible screen installed in the housing, comprising a display region and a light-transmitting region located at one terminal of the display region;
- a display window formed on the housing; and
- a screen tension assembly installed on the housing, and the screen tension assembly is configured to apply a pre-tensioning force to the flexible screen;
- wherein the flexible screen is slidable relative to the housing to make the display device in a first state, and wherein in the first state, the display region of the flexible screen opposes the display window, and the light-transmitting region is located outside the display window.

In one optional embodiment of the present disclosure, the display device further includes:
- a first roller and a second roller, wherein the first roller and the second roller are installed in the housing and located at two terminals of the housing;
- wherein the two terminals of the flexible screen are respectively curled around the first roller and the second roller, to make the flexible screen sliding around the first roller and the second roller.

In one optional embodiment of the present disclosure, the flexible screen includes a first terminal and a second terminal, the first terminal of the flexible screen bypasses the first roller and is connected to the housing by a connecting member, and the second terminal of the flexible screen bypasses the second roller and is connected to the housing by the screen tension assembly.

In one optional embodiment of the present disclosure, the connecting member further includes:
- a first rack fixedly connected to the first terminal of the flexible screen; and
- a first gear meshed with the first rack, and the first gear is rotatably connected to the housing.

In one optional embodiment of the present disclosure, the screen tension assembly further includes:
- a first fixed terminal connected to the second terminal of the flexible screen;
- a second fixed terminal fixedly connected to the housing; and
- a tension portion connected between the first fixed terminal and the second fixed terminal.

In one optional embodiment of the present disclosure, the tension portion is a spring or a telescopic rod.

In one optional embodiment of the present disclosure, the screen tension assembly includes:
- a second rack fixedly connected to the second terminal of the flexible screen; and
- a second gear meshed with the second rack, and rotatably connected to the housing.

In one optional embodiment of the present disclosure, the display device further includes:
- a first magnetic element fixed to one terminal of the screen tension assembly;
- a second magnetic element disposed on the housing and magnetically opposite to the first magnetic element; and
- a third magnetic element disposed on the housing and magnetically opposite to the first magnetic element, wherein the third magnetic element is located between the second roller and the second magnetic element; and
- when the flexible screen stops sliding, the first magnetic element is respectively attracted to the second magnetic element or the third magnetic element.

In one optional embodiment of the present disclosure, the display device further includes:
- a distance sensing component fixed to the screen tension assembly, wherein the distance sensing component is configured to sense a moving distance of the second terminal of the flexible screen relative to the housing; and
- a control element fixed to the screen tension assembly, wherein the control element is configured to control whether the flexible screen stops sliding according to the sensed moving distance.

The present disclosure further provides a display device, including:
- a housing;
- a flexible screen installed in the housing and comprising a display region and a light-transmitting region at one terminal of the display region;
- a display window formed on the housing;
- an optical assembly installed in the housing and located on a side of the flexible screen toward away from the display window; and
- a screen tension assembly installed on the housing, and the screen tension assembly is configured to apply a pre-tensioning force to the flexible screen;
- wherein the flexible screen is slidable relative to the display window to realize switching between a first state and a second state of the display device;
- wherein in the first state, the display region of the flexible screen opposes the display window, and the light-transmitting region is outside the display window; and wherein in the second state, the light-transmitting region of the flexible screen is located in the display window and opposites the optical assembly.

In one optional embodiment of the present disclosure, the display device further includes:
a first roller and a second roller, wherein the first roller and the second roller are installed in the housing and located at two terminals of the housing;
wherein the two terminals of the flexible screen are respectively curled around the first roller and the second roller, to make the flexible screen sliding around the first roller and the second roller.

In one optional embodiment of the present disclosure, the flexible screen includes a first terminal and a second terminal, the first terminal of the flexible screen bypasses the first roller and is connected to the housing by a connecting member, and the second terminal of the flexible screen bypasses the second roller and is connected to the housing by the screen tension assembly.

In one optional embodiment of the present disclosure, the connecting member further includes:
a first rack fixedly connected to the first terminal of the flexible screen; and
a first gear meshed with the first rack, and the first gear is rotatably connected to the housing.

In one optional embodiment of the present disclosure, the screen tension assembly further includes:
a first fixed terminal connected to the second terminal of the flexible screen;
a second fixed terminal fixedly connected to the housing; and
a tension portion connected between the first fixed terminal and the second fixed terminal.

In one optional embodiment of the present disclosure, the tension portion is a spring or a telescopic rod.

In one optional embodiment of the present disclosure, the screen tension assembly includes:
a second rack fixedly connected to the second terminal of the flexible screen; and
a second gear meshed with the second rack, and rotatably connected to the housing.

In one optional embodiment of the present disclosure, the display device further includes:
a first magnetic element fixed to one terminal of the screen tension assembly;
a second magnetic element disposed on the housing and magnetically opposite to the first magnetic element; and
a third magnetic element disposed on the housing and magnetically opposite to the first magnetic element, wherein the third magnetic element is located between the second roller and the second magnetic element; and
when the flexible screen stops sliding, the first magnetic element is respectively attracted to the second magnetic element or the third magnetic element.

In one optional embodiment of the present disclosure, the display device further includes:
a distance sensing component fixed to the screen tension assembly, wherein the distance sensing component is configured to sense a moving distance of the second terminal of the flexible screen relative to the housing; and
a control element fixed to the screen tension assembly, wherein the control element is configured to control whether the flexible screen stops sliding according to the sensed moving distance.

In one optional embodiment of the present disclosure, in the first state, the display device realizes full-screen display.

In one optional embodiment of the present disclosure, the display device further includes:
a cover plate installed on the housing and located above the display window and the flexible screen, wherein the flexible screen is slidable relative to the cover plate;
wherein there is a gap between the flexible screen and the cover plate, and the gap is filled with a lubricating substance.

The beneficial effects of the present disclosure are as follows: 1) The flexible screen of the display device provided by the present disclosure can slide relative to the housing, so that the light-transmitting region (camera hole) can be hidden when the photography function is turned off, so that the non-photography state (the first state) can realize full-screen display; 2) the display device provided by the present disclosure further includes a screen tension assembly, and the screen tension assembly is configured to apply a pre-tensioning force to the flexible screen, and the pre-tensioning force can maintain a flatness of the flexible screen during the sliding process, to avoid the wrinkles of the flexible screen during the sliding process from affecting the display effect of the display device.

DESCRIPTION OF FIGURES

In order to more clearly describe the technical solutions in the embodiments of the present disclosure, the following will briefly introduce the figures needed in the description of the embodiments. Obviously, the figures in the following description are only some embodiments of the present disclosure. For those skilled in the art, without inventive steps, other figures can be obtained based on these figures.

DETAILED DESCRIPTION OF EMBODIMENTS

The technical solutions in the embodiments of the present disclosure will be clearly and completely described below in conjunction with accompanying figures in the embodiments of the present disclosure. Obviously, the described embodiments are only a part of the embodiments of the present disclosure, rather than all the embodiments. Based on the embodiments of the present disclosure, all other embodiments obtained by those skilled in the art without inventive steps shall fall within a protection scope of the present disclosure.

In the description of the present disclosure, it should be understood that an orientation or positional relationship indicated by the terms "upper", "lower", etc. are based on an orientation or positional relationship shown in the figures, and are only for convenience of describing the present disclosure and simplifying the description. It does not indicate or imply that a pointed device or element must have a specific orientation, be configured and operated in the specific orientation, and therefore cannot be understood as a limitation of the present disclosure. In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include one or more of the features. In the description of the present disclosure, "plurality" means two or more, unless otherwise specifically defined.

The present disclosure may repeat reference numbers and/or reference letters in different implementations. Such repetition is for a purpose of simplification and clarity, and does not indicate a relationship between the various embodiments and/or settings discussed.

The present disclosure addresses a technical problem that current full-screen mobile phones cannot realize true full-screen display. By sliding a flexible screen, full-screen display is realized in a non-photography state, wherein a screen tension assembly is configured to maintain a flatness of the flexible screen to prevent flexible screen wrinkles during a sliding process.

Please refer to FIGS. 1-4, the present disclosure provides a display device 100. The display device 100 may be a mobile phone, a display screen, a notebook, etc. having a photographing function. In the present disclosure, the display device 100 is a mobile phone.

The display device 100 has a first state and a second state. Specifically, in one optional embodiment of the present disclosure, the first state is a non-photography state (full-screen display state), and the second state is a photography state.

Figure 1:
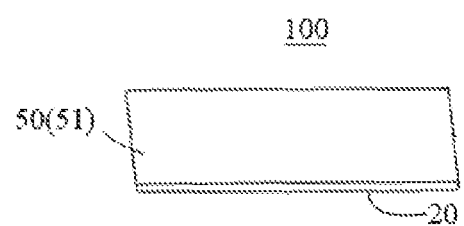
FIG. 1 is a three-dimensional schematic diagram of a display device (in a first state) provided by the present disclosure.
Figure 2:
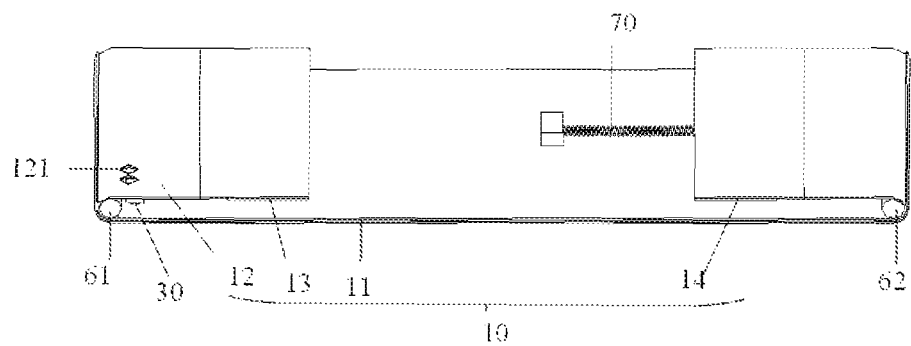
FIG. 2 is a three-dimensional schematic diagram of the display device in the first state and without a housing.
Figure 3:
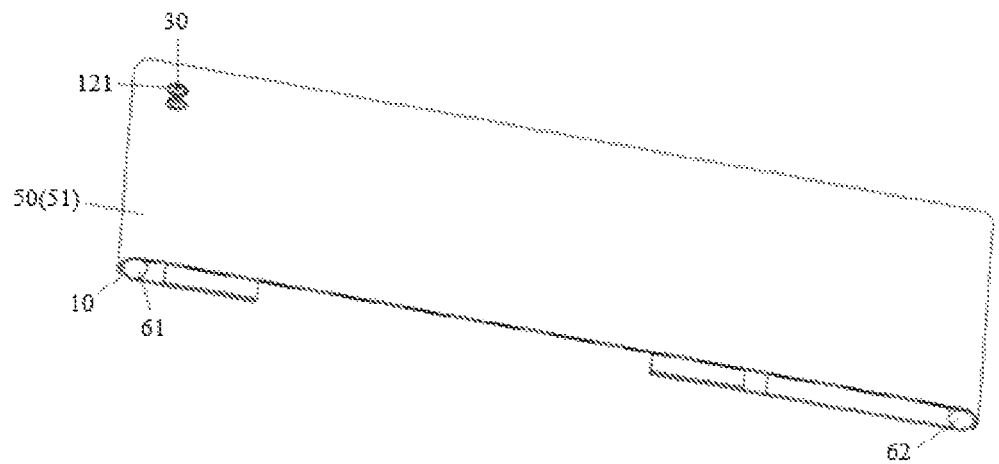
FIG. 3 is a three-dimensional schematic diagram of the display device in a second state and without a housing.

Specifically, please refer to FIGS. 1-3, the display device 100 includes a housing 20, a flexible screen 10, and an optical assembly 30. The housing 20 includes a display window 51. The flexible screen 10 is installed in the housing 20. The flexible screen 10 includes a display region 11 and a light-transmitting region 12 located at one terminal of the display region 11. The optical assembly 30 is installed in the housing 20 and is located on a side of the flexible screen 10 away from the display window 51. The flexible screen 10 is slidable relative to the display window 51 to realize switching between the first state and the second state of the display device 100.

Specifically, in the first state, the display region 11 of the flexible screen 10 is opposite to the display window 51, and the light-transmitting region 12 is located outside the display window 51. At this time, the display device 100 can realize full-screen display. In the second state, the light-transmitting region 12 of the flexible screen 10 is located in the display window 51 and opposite to the optical assembly 30. At this time, the display device 100 can perform photography, and the display device 100 cannot realize full-screen display.

In one optional embodiment of the present disclosure, a light transmittance of the film layer of the flexible screen 10 located in the light-transmitting region 12 is greater than a light transmittance of the film layer at other positions.

In one optional embodiment of the present disclosure, at least one through-hole 121 penetrating the transparent flexible screen 10 is also defined in the light-transmitting region 12. Specifically, in the first state, the through-hole 121 is hidden under the flexible screen 10 facing to the display window 51. In the second state, the through-hole 121 is located in the display window 51 and opposite to the optical assembly 30.

The through-hole 121 may be a single hole, a double hole, a multi-hole, etc., or a special-shaped hole, wherein the special-shaped hole may be a drop shape or a rectangular shape.

In one optional embodiment of the present disclosure, the flexible screen 10 further includes a non-display region (not shown in the figures) located at two terminals of the display region 11, and the light-transmitting region 12 is located in the non-display region or the display region 11.

In other embodiments, the flexible screen 10 may not include a non-display region. At this time, the entire flexible screen 10 has a display function and can realize full-screen display on a front and four sides. The flexible screen 10 further includes a first terminal 13 and a second terminal 14, wherein the first terminal 13 and the second terminal 14 are opposite to each other. In one optional embodiment of the present disclosure, the light-transmitting region 12 is located between the display region 11 and the first terminal 13. Of course, in other embodiments, the light-transmitting region 12 may also be located between the display region 11 and the second terminal 14.

In one optional embodiment of the present disclosure, the optical assembly 30 is a camera device. The optical assembly 30 is configured to cooperate with the light-transmitting region 12 to capture an image. The optical assembly 30 is installed on the housing 20 and hidden under the flexible screen 10. In the present disclosure, when the display device 100 is switched between the first state and the second state, the optical assembly 30 does not need to move.

In one optional embodiment of the present disclosure, the display device 100 further includes a first roller 61 and a second roller 62, wherein the first roller 61 and the second roller 62 are installed on the housing 20 and located at the two terminals of the display device 100. The two terminals of the flexible screen 10 are respectively curled around the first roller 61 and the second roller 62 so that the flexible screen 10 slides around the first roller 61 and the second roller 62. Specifically, the first terminal 13 and the second terminal 14 of the flexible screen 10 are parallel to the flexible screen 10 facing the display window 51.

Specifically, the flexible screen 10 can rotate around the first roller 61 and the second roller 62 by a predetermined angle. When the flexible screen 10 rotates clockwise around the first roller 61 and the second roller 62 by the predetermined angle, the display device 100 switches from the first state to the second state. When the flexible screen 10 rotates counterclockwise around the first roller 61 and the second roller 62 by the predetermined angle, the display device 100 switches from the second state to the first state.

In one optional embodiment of the present disclosure, a farthest distance between the outer edges of the first roller 61 and the second roller 62 is equal to a length of the display window 51 of the housing 20.

In one optional embodiment of the present disclosure, a distance between center points of radial cross-sections of the first roller 61 and the second roller 62 is equal to a length of the display window 51 of the housing 20.

In one optional embodiment of the present disclosure, the first terminal 13 and the second terminal 14 of the flexible screen 10 are respectively fixed on the first roller 61 and the second roller 62, and the first roller 61 and second roller 62 can rotate synchronously, thereby driving the flexible screen 10 to slide relative to the display window 51. Specifically, when the first roller 61 and the second roller 62 rotate clockwise, the flexible screen 10 slides clockwise, and the display device 100 switches from the first state to the second state. When the first roller 61 and the second roller 62 rotate counterclockwise, the flexible screen 10 slides counterclockwise, and the display device 100 switches from the second state to the first state.

In one optional embodiment of the present disclosure, the first terminal 13 and the second terminal 14 of the flexible screen 10 are radially bent relative to the first roller 61 and the second roller 62, and the first terminal 13 and the second terminal 14 of the flexible screen 10 after being bent radially by the first roller 61 and the second roller 62 are opposite to each other. Specifically, when the display device 100 is switched from the first state to the second state, the first terminal 13 and the second terminal 14 of the flexible screen 10 are moved in directions approaching the first roller 61. When the display device 100 is switched from the second state to the first state, both the first terminal 13 and the second terminal 14 of the flexible screen 10 are moved away from the first roller 61.

The display device 100 further includes a connecting member 40. One terminal of the connecting member 40 is connected to the first terminal 13 of the flexible screen 10, and another terminal of the connecting member 40 can be slidably connected to the housing 20.

Figure 4:
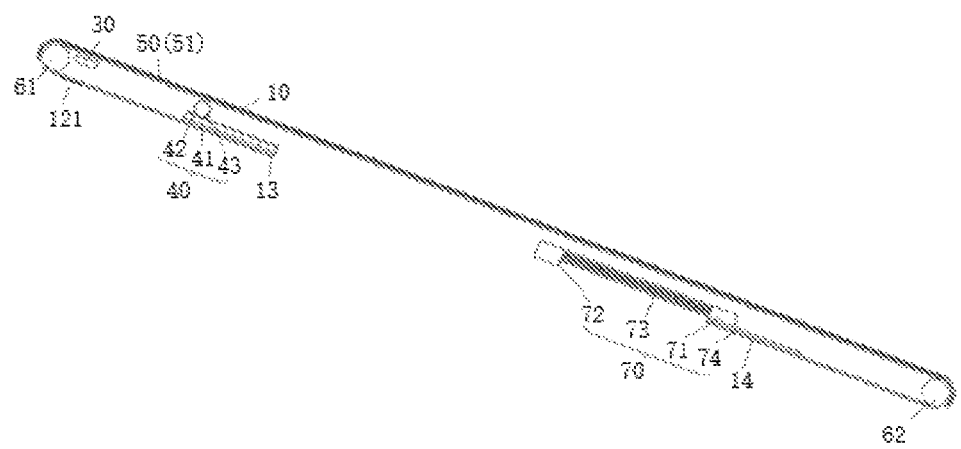
FIG. 4 is a schematic diagram of internal components of the display device in the first state.

Please refer to FIG. 4. In one optional embodiment of the present disclosure, the connecting member 40 includes a first bonding plate 41, a first rack 42, and a first gear 43. The first bonding plate 41 is fixed on the first terminal 13 of the flexible screen 10. The first rack 42 is fixed on the first bonding plate 41. The first gear 43 meshes with the first rack 42 and is rotatably connected to the housing 20. The first gear 43 rotates by applying an external force to drive the first rack 42 to slide, and the first rack 42 drives the flexible screen 10 to slide relative to the display window 51.

A length of the first rack 42 is equal to a sliding distance of the flexible screen 10 when the display device 100 is switched from the first state to the second state, so as to limit a moving distance of the flexible screen 10.

Specifically, when the first gear 43 rotates clockwise, the first rack 42 slides toward the first roller 61. When the first gear 43 rotates counterclockwise, the first rack 42 slides away from the first roller 61.

Please refer to FIG. 4. When the display device 100 is in the first state, one terminal of the first rack 42 away from the second terminal 14 of the flexible screen 10 meshes with the first gear 43.

Figure 5:
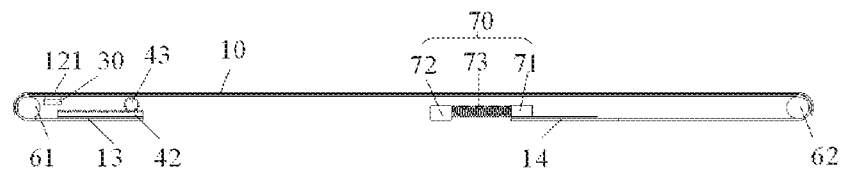
FIG. 5 is a schematic diagram of internal components of the display device in the second state.

Please refer to FIG. 5. When the flexible screen 10 is in the second state, one terminal of the first rack 42 close to the second terminal 14 of the flexible screen 10 meshes with the first gear 43.

In one optional embodiment of the present disclosure, the display device 100 further includes at least one driving component (not shown). The driving component is connected to the connecting member 40 and is configured to drive the flexible screen 10 to slide relative to the display window 51. Specifically, the driving component is disposed in the housing 20.

In one optional embodiment of the present disclosure, a film material of any layer or splicing part of the flexible screen 10 has elasticity. When one terminal of the flexible screen 10 is fixedly connected to the housing 20, a pulling force is applied to (drive) another terminal of the flexible screen 10, the film material of any layer or splicing part of the flexible screen 10 will be extended, and the display device 100 can be switched from the first state to the second state; when the pulling force received by the another terminal of the flexible screen 10 disappears, the flexible screen 10 slides in an opposite direction until it returns to original state.

In one optional embodiment of the present disclosure, when two terminals of the flexible screen 10 are slidable relative to the housing 20, the two terminals of the flexible screen 10 are synchronously driven by external forces or the driving component to drive the flexible screen 10 to slide relative to the display window 51.

The display device 100 further includes a cover plate 50 installed on the housing 20 and located on top of the display window 51 and the flexible screen 10, wherein the flexible screen 10 is slidable relative to the cover plate 50. The flexible screen 10, the optical assembly 30, the connecting member 40, the driving member, the first roller 61, and the second roller 62 are all disposed between the cover plate 50 and the housing 20, thereby improving a waterproof function of the display device 100 and extending a service life of the display device 100.

Specifically, the cover plate 50 is a glass cover plate 50.

In one optional embodiment of the present disclosure, there is a gap between the flexible screen 10 and the cover plate 50, and the gap is filled with a lubricating substance. The lubricating substance can reduce friction between the flexible screen 10 and the cover plate 50, thereby reducing wear of the flexible screen 10.

The lubricating substance can be a fluid or a film layer. When the lubricating substance is a film layer, the lubricating substance may be formed on a surface of the cover plate 50 toward the flexible screen 10 or on a surface of the flexible screen 10 toward the cover plate 50. When the lubricating substance is a fluid, the lubricating substance is directly filled in the gap between the flexible screen 10 and the cover plate 50.

The lubricating substance is transparent.

In one optional embodiment of the present disclosure, the lubricating substance may also have heat dissipation characteristics to facilitate heat dissipation of the display device 100.

Preferably, the lubricating substance is an optically clear adhesive (OCA).

Please refer to FIGS. 4-7, in one optional embodiment of the present disclosure, the display device 100 further includes a screen tension assembly 70, and the screen tension assembly 70 is installed in the housing 20. The screen tension assembly 70 applies a pre-tensioning force to the flexible screen 10. The screen tension assembly 70 can tension the flexible screen 10 at all times, so as to maintain flatness of the flexible screen 10.

The screen tension assembly 70 is fixedly connected to the second terminal 14 of the flexible screen 10.

In one optional embodiment of the present disclosure, a terminal of the screen tension assembly 70 is fixed to the housing 20, and another terminal of the screen tension assembly 70 is fixedly connected to the second terminal 14 of the flexible screen 10. Another terminal of the screen tension assembly 70 opposite to the terminal fixedly connected to the second terminal 14 of the flexible screen 10 has elasticity and can drive the second terminal 14 of the flexible screen 10 to move closer to or away from the first roller 61.

In one optional embodiment of the present disclosure, the first terminal 13 of the flexible screen 10 and an entire screen tension assembly 70 is slidably connected to the housing 20, and the entire screen tension assembly 70 can be slid with sliding of the flexible screen 10. When the display device 100 is switched between the first state and the second state, the pre-tensioning force does not change. Specifically, the entire screen tension assembly 70 can slide synchronously with the connecting member 40.

In one optional embodiment of the present disclosure, the flexible screen 10 has elasticity, the first terminal 13 of the flexible screen 10 is fixedly connected to the housing 20, and the screen tension assembly 70 is slidable relative to the housing 20. Because the first terminal 13 of the flexible screen 10 is fixed on the housing 20, when the screen tension assembly 70 slides in a direction toward the first roller 61 on the housing 20, the film material of any layer or splicing part of the flexible screen 10 will be extended, and the display device 100 can be switched from the first state to the second state; when the screen tension assembly 70 returns to an initial position, the flexible screen 10 returns to the original state.

Specifically, please refer to FIGS. 4-7, the screen tension assembly 70 includes a first fixed terminal 71, a second fixed terminal 72, a tension portion 73, and a second bonding plate 74. The first fixed terminal 71 is connected to the second terminal 14 of the flexible screen 10. The second fixed terminal 72 is disposed on the second bonding plate 74, and the second bonding plate 74 is disposed on the housing 20. The tension portion 73 is connected between the first fixed terminal 71 and the second fixed terminal 72. The tension portion 73 is configured to generate a pre-tensioning force.

In one optional embodiment of the present disclosure, the second fixed terminal 72 is fixed on the housing 20, and the first fixed terminal 71 can slide with sliding of the flexible screen 10. When the display device 100 is switched between the first state and the second state, the pre-tensioning force changes with sliding of the flexible screen 10.

In one optional embodiment of the present disclosure, both the second fixed terminal 72 and the first fixed terminal 71 are slidable relative to the housing 20. When the entire screen tension assembly 70 slides synchronously with the connecting member 40, the pre-tensioning force remains unchanged.

Please refer to FIGS. 4-5. In one optional embodiment of the present disclosure, the tension portion 73 is a spring. When the display device 100 is switched between the first state and the second state, the spring is always in a stretched state. Specifically, when the display device 100 is switched from the first state to the second state, an amount of deformation of the spring gradually decreases, and the pre-tensioning force decreases. When the display device 100 is switched from the second state to the first state, the amount of deformation of the spring gradually increases, and the pre-tensioning force increases.

Figure 6:
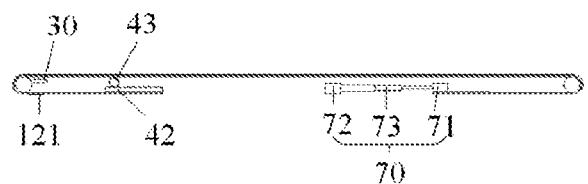
FIG. 6 is a schematic diagram of internal components of another display device in the first state provided by the present disclosure.
Figure 7:
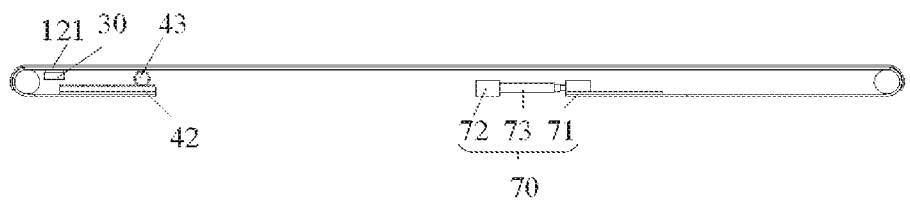
FIG. 7 is a schematic diagram of internal components of another display device in the second state provided by the present disclosure.

Please refer to FIGS. 6-7, in one optional embodiment of the present disclosure, the tension portion 73 is a telescopic rod. The telescopic rod always exerts a pulling force (pre-tensioning force) on the second terminal 14 of the flexible screen 10. Specifically, when the display device 100 switches from the first state to the second state, the telescopic rod gradually contracts, and when the display device 100 is switched from the second state to the first state, the telescopic rod gradually extends.

In one optional embodiment of the present disclosure, the tension portion 73 may also be a rigid connecting rod as long as it is guaranteed that the tension portion 73 always tensions the flexible screen 10. At this time, the screen tension assembly 70 needs to be driven synchronously with the connecting member 40 to slide relative to the housing 20.

Figure 8:
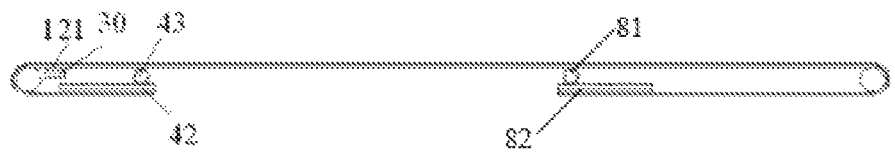
FIG. 8 is a schematic diagram of internal components of another display device in the second state provided by the present disclosure

Referring to FIG. 8, in one optional embodiment of the present disclosure, a structure of the screen tension assembly 70 is similar to a structure of the connecting member 40, and the screen tension assembly 70 includes a second rack 82 fixedly connected to the second terminal 14 of the flexible screen 10, and a second gear 81 that meshes with the second rack 82. The second gear 81 is rotatably connected with the housing 20.

In one optional embodiment of the present disclosure, when the connecting member 40 and the screen tension assembly 70 are synchronously driven by two driving components, the screen tension assembly 70 can also control through the above-mentioned first gear 43 and the first rack 42 a distance that the screen tension assembly 70 drives the flexible screen 10.

In one optional embodiment of the present disclosure, the display device 100 further includes a first magnetic element fixed to one terminal of the screen tension assembly 70; a second magnetic element disposed on the housing 20 and magnetically opposite to the first magnetic element; and a third magnetic element disposed on the housing 20 and magnetically opposite to the first magnetic element. The third magnetic element is located between the second roller 62 and the second magnetic element. When the flexible screen 10 stops sliding, the first magnetic element is respectively attracted to the second magnetic element or the third magnetic element. Specifically, when the display device 100 is in the first state, the first magnetic element attracts the second magnetic element. When the display device 100 is in the second state, the first magnetic element attracts the third magnetic element.

A distance between the second magnetic element and the third magnetic element is equal to the sliding distance of the flexible screen 10 when the display device 100 is switched from the first state to the second state.

In one optional embodiment of the present disclosure, the display device 100 further includes a distance sensing component fixed to the screen tension assembly 70, wherein the distance sensing component is configured to sense a moving distance of the second terminal 14 of the flexible screen 10 relative to the housing 20; and a control element fixed to the screen tension assembly 70, wherein the control element is configured to control whether the flexible screen 10 stops sliding according to a sensed moving distance.

Of course, in one optional embodiment of the present disclosure, the connecting member 40 can also be provided with the above-mentioned first magnetic element, the second magnetic element, and the third magnetic element, and the above-mentioned distance sensing component and the control element can also be provided.

In one optional embodiment of the present disclosure, the display device 100 further includes a control device (not shown), and the control device is configured to control the display device 100 to automatically switch between the first state and the second state. When user turns on the camera function, the control device controls the driving component to drive the flexible screen 10 to slide clockwise until the light-transmitting region 12 is opposite to the optical assembly 30. When user turns off the camera function, the control device controls the driving component to drive the flexible screen 10 to slide counterclockwise until the light-transmitting region 12 is hidden in the first roller 61 or under the flexible screen 10 opposite to the display window 51, and the display device 100 realizes full-screen display.

In one optional embodiment of the present disclosure, a sliding key (not shown) is further provided on the housing 20, and the sliding key is fixedly connected to the connecting member 40. The flexible screen 10 slides relative to the display window 51 by pushing the sliding key.

The beneficial effects of the present disclosure are as follows: 1) The flexible screen of the display device provided by the present disclosure can slide relative to the housing, so that the light-transmitting region (imaging hole) can be hidden when the photography function is turned off, so that the non-photography state (the first state) can realize full-screen display; 2) the display device provided by the present disclosure further includes a screen tension assembly, and the screen tension assembly is configured to apply a pre-tensioning force to the flexible screen, and the pre-tensioning force can maintain flatness of the flexible screen during the sliding process to prevent wrinkles appearing on the flexible screen during the sliding process from affecting the display effect of the display device; 3) The display device provided by the present disclosure only needs to drive the flexible screen to slide relative to the housing to realize switching between the first state and the second state, while the optical assembly remains stationary. Compared with a display device requiring the camera lifting assembly to realize switching states in the prior art mentioned in the background of the invention, a structure of the present disclosure is simpler, and the optical assembly is not easily damaged.

In summary, although the present disclosure has been disclosed as above in preferred embodiments, the above-mentioned preferred embodiments are not intended to limit the present disclosure. Those skilled in the art can make various changes and modifications without departing from the spirit and scope of the present disclosure. Therefore, the protection scope of the present disclosure is subject to the scope defined by the claims.

What is claimed is:

1. A display device, comprising:
   a housing;
   a flexible screen installed in the housing, comprising a display region and a light-transmitting region located at one terminal of the display region;
   a display window formed on the housing; and
   a screen tension assembly installed in the housing, and the screen tension assembly is configured to apply a pre-tensioning force to the flexible screen;
   wherein the flexible screen is slidable relative to the housing to make the display device be in a first state, and wherein in the first state, the display region of the flexible screen is opposite to the display window, and the light-transmitting region is located outside the display window;
   wherein the display device further comprises:
   a first magnetic element fixed to one terminal of the screen tension assembly;
   a second magnetic element disposed on the housing and magnetically opposite to the first magnetic element; and
   a third magnetic element disposed on the housing and magnetically opposite to the first magnetic element, wherein the third magnetic element is located between a second roller and the second magnetic element; and
   when the flexible screen stops sliding, the first magnetic element is respectively attracted to the second magnetic element or the third magnetic element.

2. The display device according to claim 1, wherein the display device further comprises:
   a first roller and a second roller, wherein the first roller and the second roller are installed in the housing and located at two terminals of the housing;
   wherein two terminals of the flexible screen are respectively curled around the first roller and the second roller to make the flexible screen slide around the first roller and the second roller.

3. The display device according to claim 2, wherein the flexible screen comprises a first terminal and a second terminal, the first terminal of the flexible screen bypasses the first roller and is connected to the housing by a connecting member, and the second terminal of the flexible screen bypasses the second roller and is connected to the housing by the screen tension assembly.

4. The display device according to claim 3, wherein the connecting member comprises:
   a first rack fixedly connected to the first terminal of the flexible screen; and
   a first gear meshed with the first rack and rotatably connected to the housing.

5. The display device according to claim 4, wherein the screen tension assembly comprises:
   a first fixed terminal connected to the second terminal of the flexible screen;
   a second fixed terminal fixedly connected to the housing; and
   a tension portion connected between the first fixed terminal and the second fixed terminal.

6. The display device according to claim 5, wherein the tension portion is a spring or a telescopic rod.

7. The display device according to claim 3, wherein the screen tension assembly comprises:
   a second rack fixedly connected to the second terminal of the flexible screen; and
   a second gear meshed with the second rack and rotatably connected to the housing.

8. The display device according to claim 1, wherein the display device further comprises:
   a distance sensing component fixed to the screen tension assembly, wherein the distance sensing component is configured to sense a moving distance of a second terminal of the flexible screen relative to the housing; and
   a control element fixed to the screen tension assembly, wherein the control element is configured to control whether the flexible screen stops sliding according to the sensed moving distance.

9. A display device, comprising:
   a housing;
   a flexible screen installed in the housing and comprising a display region and a light-transmitting region at one terminal of the display region;
   a display window formed on the housing;
   an optical assembly installed in the housing and located on a side of the flexible screen facing away from the display window; and
   a screen tension assembly installed in the housing, and the screen tension assembly is configured to apply a pre-tensioning force to the flexible screen;
   wherein the flexible screen is slidable relative to the display window to realize switching between a first state and a second state of the display device;
   wherein in the first state, the display region of the flexible screen is opposite to the display window, and the light-transmitting region is outside the display window; and
   wherein in the second state, the light-transmitting region of the flexible screen is located in the display window and opposite to the optical assembly;

wherein the display device further comprises:
a first magnetic element fixed to one terminal of the screen tension assembly;
a second magnetic element disposed on the housing and magnetically opposite to the first magnetic element; and
a third magnetic element disposed on the housing and magnetically opposite to the first magnetic element, wherein the third magnetic element is located between a second roller and the second magnetic element; and
when the flexible screen stops sliding, the first magnetic element is respectively attracted to the second magnetic element or the third magnetic element.

10. The display device according to claim 9, further comprising:
a first roller and a second roller, wherein the first roller and the second roller are installed in the housing and located at two terminals of the housing;
wherein two terminals of the flexible screen are respectively curled around the first roller and the second roller to make the flexible screen slide around the first roller and the second roller.

11. The display device according to claim 10, wherein the flexible screen comprises a first terminal and a second terminal, the first terminal of the flexible screen bypasses the first roller and is connected to the housing by a connecting member, and the second terminal of the flexible screen bypasses the second roller and is connected to the housing by the screen tension assembly.

12. The display device according to claim 11, wherein the connecting member comprises:
a first rack fixedly connected to the first terminal of the flexible screen; and
a first gear meshed with the first rack, and the first gear is rotatably connected to the housing.

13. The display device according to claim 12, wherein the screen tension assembly comprises:
a first fixed terminal connected to the second terminal of the flexible screen;
a second fixed terminal fixedly connected to the housing; and
a tension portion connected between the first fixed terminal and the second fixed terminal.

14. The display device according to claim 13, wherein the tension portion is a spring or a telescopic rod.

15. The display device according to claim 11, wherein the screen tension assembly comprises:
a second rack fixedly connected to the second terminal of the flexible screen; and
a second gear meshed with the second rack, and rotatably connected to the housing.

16. The display device according to claim 9, further comprising:
a distance sensing component fixed to the screen tension assembly, wherein the distance sensing component is configured to sense a moving distance of a second terminal of the flexible screen relative to the housing; and
a control element fixed to the screen tension assembly, wherein the control element is configured to control whether the flexible screen stops sliding according to the sensed moving distance.

17. The display device according to claim 9, wherein in the first state, the display device realizes full-screen display.

* * * * *